United States Patent
Monsees

[19]

[11] Patent Number: 6,044,959
[45] Date of Patent: Apr. 4, 2000

[54] APPARATUS FOR STAGING (PITCHING) ARTICLES ON A CONVEYOR SYSTEM

[75] Inventor: Claude E. Monsees, Fort Mill, S.C.

[73] Assignee: Roberts PolyPro, Inc., Charlotte, N.C.

[21] Appl. No.: 09/191,013

[22] Filed: Nov. 12, 1998

[51] Int. Cl.[7] ................................................ B65G 47/31
[52] U.S. Cl. .................................. 198/461.1; 198/461.2; 198/689.1
[58] Field of Search .................. 198/461.1, 461.2, 198/461.3, 689.1, 419.2, 419.3

[56] References Cited

U.S. PATENT DOCUMENTS

| | | | |
|---|---|---|---|
| 3,482,674 | 12/1969 | Wiseman | 198/461.3 |
| 3,908,333 | 9/1975 | Cavanna | 53/51 |
| 3,938,650 | 2/1976 | Holt | 198/461.2 X |
| 3,964,598 | 6/1976 | Alsop | 198/415 |
| 5,099,979 | 3/1992 | Kehrel | 198/836.3 X |
| 5,547,004 | 8/1996 | Fransen | 198/419.3 |
| 5,685,410 | 11/1997 | Ritola et al. | 198/461.2 X |
| 5,823,528 | 10/1998 | Draghetti et al. | 271/270 |
| 5,827,162 | 10/1998 | Rubin et al. | 493/178 |
| 5,971,134 | 10/1999 | Trefz et al. | 198/689.1 X |

Primary Examiner—James R. Bidwell
Attorney, Agent, or Firm—Hardaway/Mann IP Group

[57] ABSTRACT

An apparatus for staging or pitching articles on a conveyor system. Arranged on a supporting table is a first set of belts covering approximately one-half of the length of the table travelling at a high rate of speed, and having a high function surface. Arranged on the second half of the table and traveling in the same direction are slower belts having a low friction surface. Laterally, preferably outside the first and second belts are two or more belts traveling at a slower speed, having a low friction surface and carrying projection away from the surface of the table to align articles during the transfer from high to low speed. Preferably, the table is a plenum and suction draws articles to the surface.

11 Claims, 3 Drawing Sheets

APPARATUS FOR STAGING (PITCHING) ARTICLES ON A CONVEYOR SYSTEM

BACKGROUND OF THE INVENTION

The present invention relates generally to an apparatus for staging or pitching articles. Specifically, the present invention relates to a conveyor table that provides a predetermined distance between adjacent articles carried on the conveyor table.

The spacing, sequencing, staging or pitching (the terms as used herein are synonymous), of articles moving along a conveyor assembly is an important task. Proper pitching of the articles reduces the tendency for the apparatus to jam. In a continuous, high throughput manufacturing operation, maintaining a predetermined distance between an article and a subsequent article is necessary so that the operations on a first article can be completed without interference from the second article. The subsequent article then must be in the proper initial position and orientation for the completion of operations on it.

To pitch the articles, conventional apparati use conveyor belts operating at different speeds. U.S. Pat. No. 3,908,333 to Cavanna typifies such a conventional apparatus. The conveyor includes several endless conveyor belts. The faster operating conveyor belts have pusher elements thereon-projections from the belt which prevent slipping of the conveyed article on the belt. The slower moving conveyor belts generally lack the pusher elements. The slower moving conveyor belts transport the articles until the pusher elements on the faster moving conveyor belt, initially trailing the article, contact a rear edge of the article. At that point, the faster moving conveyor belt captures and transports the article. The pusher elements somewhat maintain the proper pitch of the articles.

One drawback of the aforementioned device may be the misalignment caused by the pusher elements especially when multiple belts are used and become out of synchronization. As the faster moving pusher elements contact the article, the pusher elements can skew the article on the conveyor assembly. The mass of the conveyor belt and pusher elements is significantly greater than the mass of the article, creating exaggerated effects on the article when contacted by the pusher elements especially as throughput is increased. Skewing articles on the conveyor assembly can jam the apparatus or cause quality control problems.

BRIEF SUMMARY OF THE INVENTION

It is an object of the present invention to provide an apparatus to pitch articles on a conveyor system.

It is a further object of the present invention to provide an apparatus that maintains articles carried thereon in a proper orientation.

It is a further object of the present invention to provide an apparatus that reduces the instances of misfeed.

It is a further object of the present invention to provide an apparatus that can operate reliably at higher speeds.

It is a further object of the present invention to provide an apparatus that allows rapid removal and replacement of parts.

It is a further object of the present invention to provide an apparatus that allows rapid changing of the pitch maintained between adjacent articles.

These and other objects are achieved in one aspect of the present invention by an apparatus for pitching articles, comprising: a table; a first conveyor belt located on the table; a second conveyor belt located on the table, the second conveyor having projections extending outwardly therefrom; and at least one motor operating the first conveyor belt at a first speed and means for operating the second conveyor belt at a second speed, slower than the first conveyor belt speed.

These and other objects are achieved in a second aspect of the present invention by a method of pitching articles, comprising the steps of: providing an article handling unit, comprising: a table; a first conveyor belt traversing at least one exposed surface of the table; a second conveyor belt located on a surface of the table, the second conveyor belt having projections extending outwardly therefrom; and at least one means for operating the first and second conveyor belts; placing an article on the article handling unit; driving the first conveyor at a first speed to transport the article along the article handling unit; and driving the second conveyor at a second speed, slower than the first conveyor belt speed. The article approaches one of the projections on the second conveyor belt at the first speed and in the direction of travel of the second conveyor belt. The article becomes constrained by the projection from the second conveyor belt to travel at the slower rate of speed.

In a third aspect of the invention, the first conveyor belt traverses the table parallel to the second conveyor but for only a portion of the distance traversed by the second conveyor belt. A third belt traverses the table parallel to the second belt linearly aligned with said first belt but operating at substantially the same speed as the second belt.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION OF THE PREFERRED EMBODIMENTS

Figure 1:
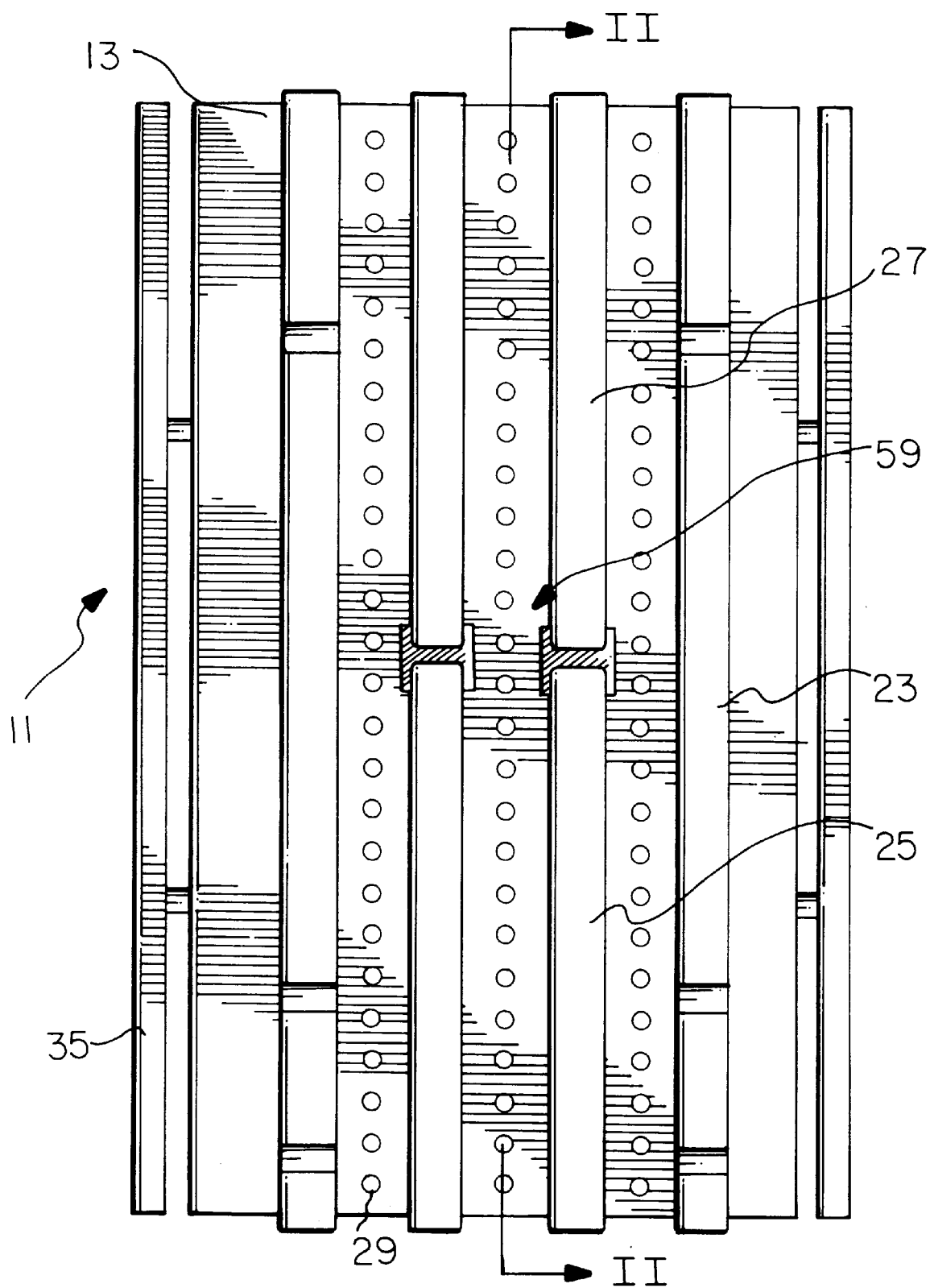
FIG. 1 is a plan view of one embodiment of the present invention.
Figure 2:
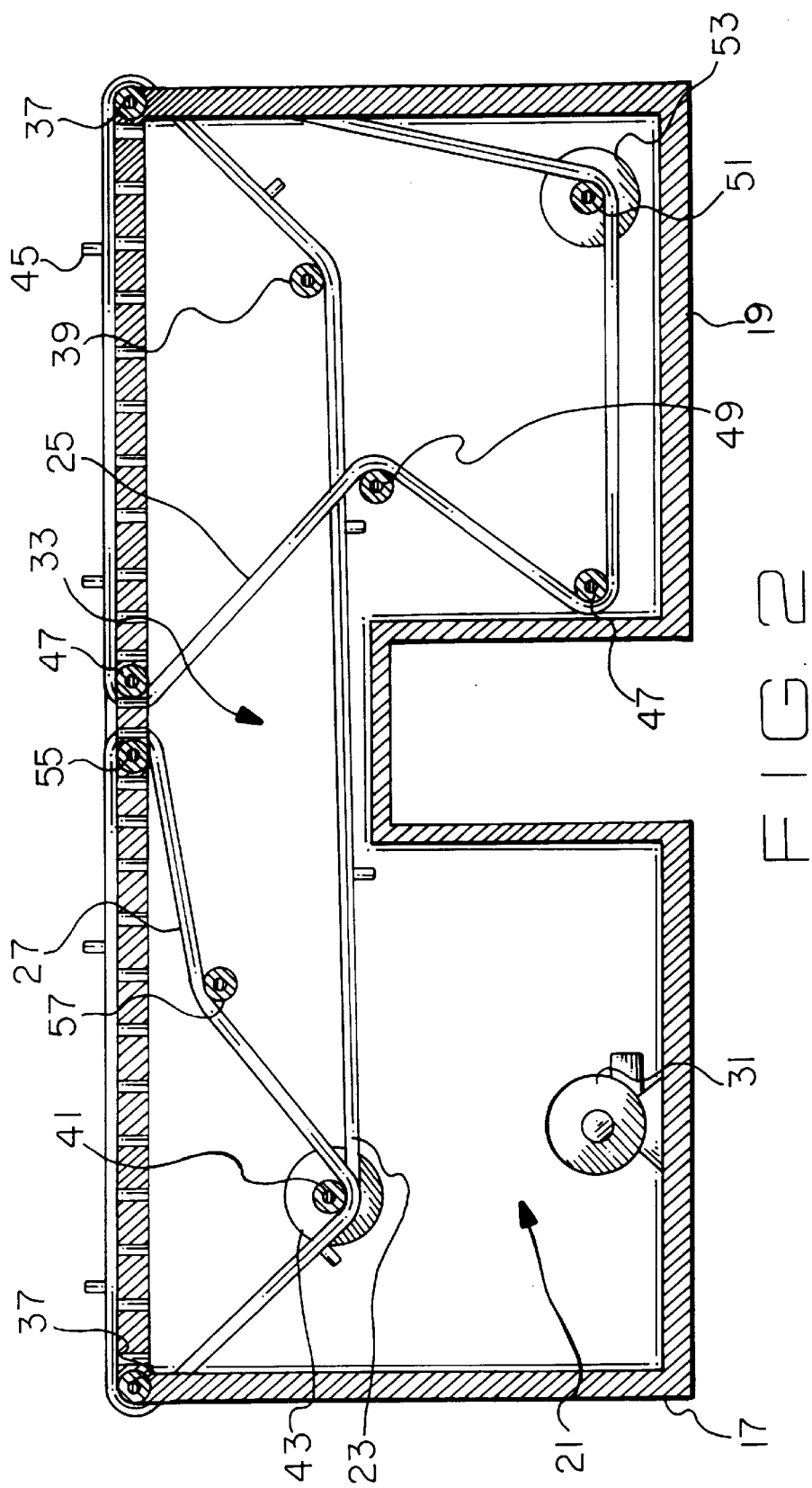
FIG. 2 is a cross-sectional view of the embodiment of the present invention shown in FIG. 1 taken along line 11—11.
Figure 3:
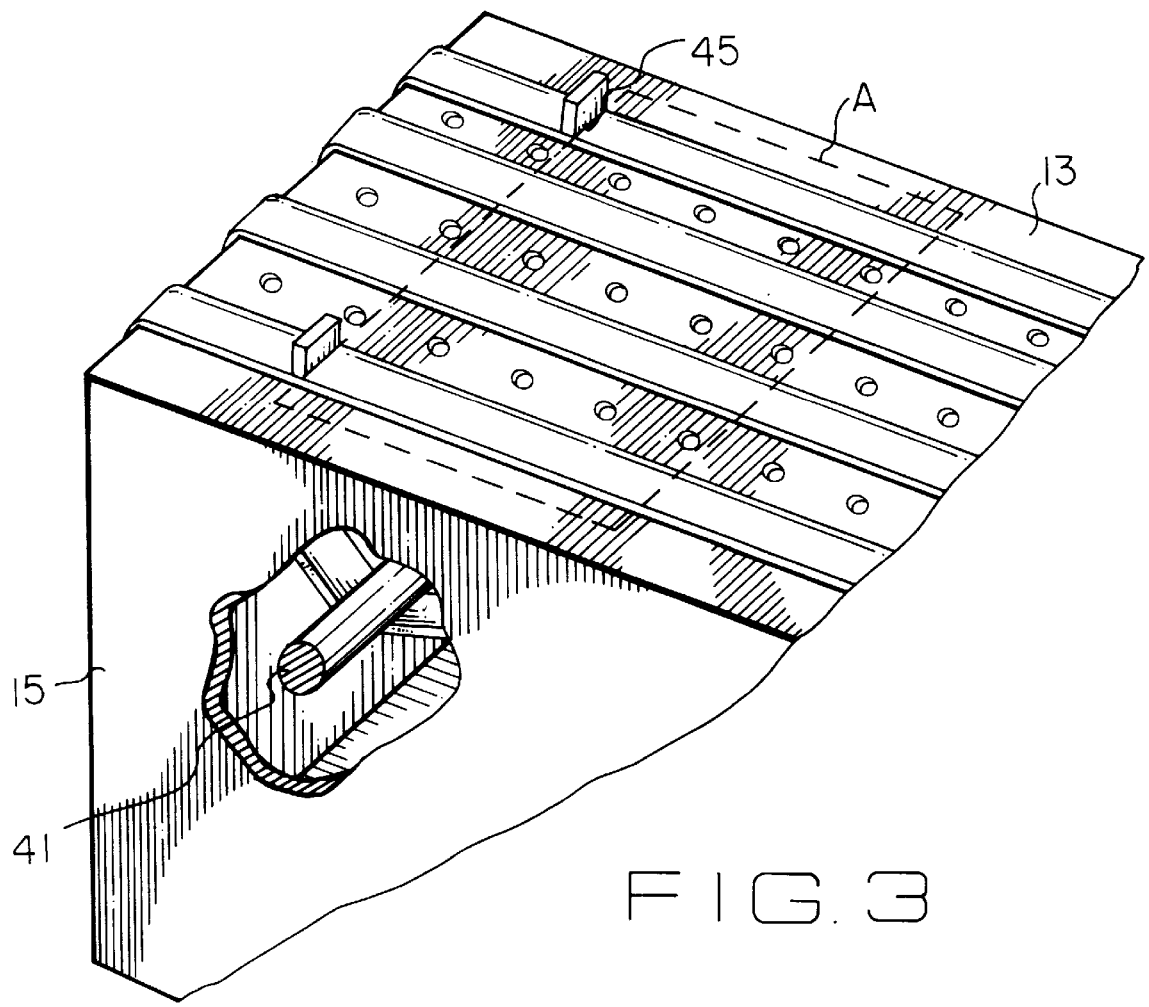
FIG. 3 is a perspective view, with partial cutaway, of a portion of the embodiment of the present invention shown in FIG. 1.

FIGS. 1–3 display one embodiment of the present invention. The apparatus includes a housing 11 formed by a table, or upper surface 13, side walls 15, end walls 17, and bottom surface 19. Table 13, side walls 15, end walls 17 and bottom surface 19 form an enclosure 21.

Table 13, along with a series of endless conveyor belts 23, 25, 27 thereon, transport articles A (shown in phantom in FIG. 3) downstream. In order to help maintain proper article orientation on conveyor belts 23, 25, 27, table 13 includes apertures 29 therein. Aside from apertures 29, enclosure 21 should be airtight. An air-moving means such as fan 31 withdraws air from enclosure 21. The vacuum produced by fan 31 draws air through apertures 29 and into enclosure 21. Any article A positioned above apertures 29 is drawn towards table 13. The force with which table 13 retains article A depends upon the amount of suction force created by fan 31.

As seen in FIG. 2, enclosure 21 preferably is compartmentalized and has an area of reduced volume, or plenum 33. Fan 31 preferably resides with the downstream compartment of enclosure 21 (see FIG. 2). As a result, the suction force on articles A that are positioned downstream is greater than the suction force on articles A that are positioned further upstream. The relative sizes of enclosure 21 and plenum 33, along with other factors, determine the relative suction force gradient along table 13.

As seen in FIG. 1, the apparatus can include adjustable rails 35 extending along side walls 15. Rails 35 are positionable at selected distances relative to side walls 15 depending on the size of the article carried thereon and the amount of guidance needed. Rails 35 help guide articles A downstream and help maintain alignment of the article on the conveyor belts 23, 25, 27.

Conveyor belts 23 preferably extend the entire length of table 13. As seen in FIG. 1, conveyor belts 23 flank conveyor belts 25, 27. Conveyor belts 25, 27 preferably only extend along a portion of the length of table 13.

Conveyor belts 23 travel around enclosure 11 using idler rollers 37, tension roller 39 and a drive roller 41. A motor 43 rotates drive roller 41, propelling conveyor belts 23. Each conveyor belt 23 could utilize its own motor, but in order to operate conveyor belts 23 at the same speed, a single motor is preferred. Tension roller 39 removes slack in conveyor belts 23 in a conventional manner.

As seen in FIG. 3, the rollers used with conveyor belts 23 are preferably cantilevered. This allows rapid removal of conveyor belts 23 from the apparatus. An operator can quickly swap different conveyor belts onto the apparatus without disturbing the other conveyor belts 25, 27. The lateral positioning of conveyor belts 23 also aid in the removal process. The new conveyor belts could have a different pitch, or the same pitch, as the now-removed conveyor belts.

Conveyor belts 23 include projections 45 extending therefrom. Projections 45 can have a variety of shapes and methods of securement and are not otherwise limited. The distance between adjacent projections 45 determines the pitch of articles A carried thereon.

FIG. 3 demonstrates projections 45 as being a block permanently secured to conveyor belt 23. Alternatively, projections 45 could be a post extending from conveyor belt 23 or another suitable shape. Additionally, projections could be removably mounted to conveyor belt 23. This would allow selective adjustment of the pitch, or distance between adjacent projections 45, on conveyor belt 23.

The apparatus preferably uses two conveyor belts 23. When the apparatus uses two, or more, conveyor belts 23, the location of projections 45 on each conveyor 23 becomes important. The projections on each conveyor 23 should have the same longitudinal position (in other words, when viewed from the side, such as in FIG. 2) when placed on table 13. This ensures proper positioning of article A when article A contacts projections 45. In other words, if the projections 45 on each conveyor 23 were out of phase, articles A carried on table 13 would skew, potentially interrupting the article handling process. In some instances, article A may have a leading edge which is not orthodinal to the sides of the conveyor (e.g. may be trapezoidal), in which case the projections 45 may be staggered and angled.

Conveyor belts 25 preferably extend only along a portion of table 13. As seen in FIG. 1, conveyor belts 25 travel approximately the first half of table 13. The conveyor belts 25 are preferably a laminated belt having a surface of a high friction material such as a high tack rubber (e.g., Linotex™)

As with conveyor belts 23, conveyor belts 25 travel around enclosure 11 using a series of rollers. Preferably, conveyor belts 25 travel on rollers having a common axis to the other conveyor belts where possible. As seen in FIG. 2, conveyor belts 25 utilize one common idler roller axis 37, but also rely upon additional idler rollers 47, tension roller 49 and drive roller 51. A motor 53 rotates drive roller 51, driving conveyor belts 25. Each conveyor belt 25 could utilize its own motor, but a single motor is preferred to ensure the same operational speed. Tension roller 49 removes slack in conveyor belts 25 in a conventional manner.

Conveyor belts 25 utilize a motor different than the motor used with conveyor belts 23 and 27 since the present invention operates these belts at different speeds. Specifically, motor 53 drives conveyor belts 25 faster than conveyor belts 23 and 27. This allows article A travelling along table 13 and between adjacent projections 45 to catch up with and eventually to contact the leading projection 45. (A leading projection refers to the projection located downstream of article A. A trailing projection refers to the projection located upstream of the article.) Obviously, by using difference sheave sizes and different motor locations than those shown in FIG. 2, it would be obvious to a skilled artisan to run all belts and the fan from one motor.

Conveyor belts 27 extend along the remainder of table 13 not occupied by conveyor belts 25. As seen in FIG. 1, conveyor belts 27 travel the second half of table 13. The purpose of which will become clearer below, conveyor belts 27 are preferably made of a low friction material, having low tack compared to the surface of belt 25.

As with the other conveyor belts, conveyor belts 27 travel around enclosure 11 using a series of rollers. Preferably, conveyor belts 27 travel on rollers or roller axes common to the other conveyor belts where possible. As seen in FIG. 2, conveyor belts 27 utilize one common idler roller 37, but also rely upon an additional idler roller 55 and a tension roller 57.

Preferably, conveyor belts 27 operate at the same speed as conveyor belts 23. With that arrangement, conveyor belts 27 may use motor 43 that additionally rotates conveyor belts 23.

Alternatively, however, conveyor belts 27 could utilize their own separate motor (not shown). This is desired when, for example, conveyor belts 27 are operated at a slightly faster speed than conveyor belts 23. Since conveyor belts 27 are made from a low friction material similar to or the same as belt 23, operations at a speed slightly greater than conveyor belts 23 should not cause skewing of the articles.

The apparatus can include a control system (not shown), for example, to monitor operations and to control drive motors 43, 53 and fan motor 31. The control system could be part of a larger control system (not shown) for the other components (not shown) used in an integrated article handling process.

The operation of the apparatus will now be described. As discussed above, the apparatus is part of a larger article handling unit, such as a carton forming assembly. In a carton forming assembly, various components transform a blank into a carton, then package the cartons for transport. The present invention can provide a desired spacing, or pitch, to articles A travelling along the various components of the article handling unit.

The apparatus of the present invention receives articles A from an upstream component of the article handling unit, such as a prefeeder (not shown). The upstream component of the article handling unit could, for example, receive articles A in an overlapping, or shingled, condition, then dispense one article A from the stack at a time. The upstream component of article handling unit dispenses article A so that it enters between a leading and a trailing projection 45 on conveyor belts 23.

Conveyor belts 25, utilizing their high friction material and the slight vacuum caused by fan 31, transports article A along table 13. Travelling faster than conveyor belts 23, conveyor belts 25 bring article A closer to leading projections 45 on conveyor belts 23.

Eventually, article A will contact the rear of leading projections 45. When article A contacts the rear of leading projections 45, articles A exhibit the desired spacing, or pitch, between adjacent articles A travelling along table 13.

Preferably, article A contacts leading projections 45 near a transition area 59. Transition area 59 is the location along table 13 where conveyor belts 25 end, and conveyor belts 27 begin. Contact between article A and projections 45 should occur near transition area 59 to prevent skewing of articles A on table 13. If the high friction conveyor belts 25 continued to drive articles A faster than conveyor belts 23, skewing is likely. Therefore, around the time article A contacts projections 45, articles A should be controlled by conveyor belts 27 and 23. The result is a "soft landing" of the article onto the slower belts and into projections 45.

Conveyor belts 27, using the suction created by fan 31, continue to drive articles A along table 13. The low friction material of conveyor belts 27 prevents skewing of articles A since they do not continue to drive article A against projections 45. Once resting against projections 45, the low friction material of conveyor belts 27 prevents further movement of article A. Conveyor belts 27 may be driven slightly faster than conveyor belts 23 in case conveyor belts 25 did not drive article A sufficiently forward to contact projections 45. This may be accomplished by small changes in diameters of rollers 41.

The apparatus delivers properly spaced, or pitched, articles A to the downstream component of the article handling unit. A downstream component of the article handling unit could be, for example, a folder/gluer which creases and glues flaps (not shown) on article A.

Applicants understand that many other variations are apparent to one of ordinary skill in the art from a reading of the above specification. Such variations are within the spirit and scope of the instant invention as defined by the following appended claims.

I claim:

1. An apparatus for staging or pitching articles, comprising:
   a table having side walls, end walls, and a bottom surface, said walls and bottom surface forming a substantially airtight enclosure;
   a first conveyor belt traversing a face of said table;
   a second conveyor belt located on the same exposed face of said table, said second conveyor belt having at least one projection extending therefrom; and
   at least one motor operating said first conveyor belt at a first speed and operating said second conveyor belt at a second speed which is slower than said first speed, both of said belts moving in a common direction;
   wherein the articles carried on said first conveyor belt approach one of said projections on said second conveyor belt in the common direction.

2. The apparatus for pitching articles as recited in claim 1, further comprising a pair of rails positioned along said table.

3. The apparatus for pitching articles as recited in claim 1, further comprising a means operatively connected to said enclosure for evacuating air from said enclosure; and,
   wherein said table face includes a plurality of apertures communicating to said enclosure and located transversely between said belts on the exposed face of said table.

4. The apparatus for pitching articles as recited in claim 1, wherein said enclosure is divided into a plurality of compartments.

5. The apparatus for pitching articles as recited in claim 1, wherein said second conveyor belt comprises a plurality of second conveyor belts flanking said first conveyor belt.

6. The apparatus for pitching articles as recited in claim 1, further comprising:
   a third conveyor belt traversing the same exposed face of said table and operated by said at least one motor, said third conveyor belt extending over a portion of a length of said table;
   wherein said first conveyor belt extends over a remainder of said length of said table.

7. The apparatus for pitching articles as recited in claim 6, wherein said at least one motor operates said third conveyor belt at a speed less than said first conveyor belt speed.

8. The apparatus for pitching articles as recited in claim 6, wherein said first conveyor belt is made from a material having a coefficient of friction and said second and third conveyor belts are made from a material having a lower coefficient of friction than said first conveyor belt.

9. The apparatus for pitching articles as recited in claim 1, further comprising:
   a series of rollers receiving said second conveyor belt, said rollers secured to said table in cantilever fashion to allow removal of said second conveyor belt without removal of said first and second conveyor belts.

10. The apparatus for pitching articles as recited in claim 6, further comprising:
    a series of rollers receiving said second conveyor belt, said rollers secured to said table in cantilever fashion to allow removal of said second conveyor belt without removal of said first and third conveyor belts.

11. The apparatus for pitching articles as recited in claim 10, wherein said pair of rails are adjustably positioned along said table.

* * * * *